United States Patent
Beraud

(10) Patent No.: US 9,658,721 B2
(45) Date of Patent: May 23, 2017

(54) CONTROL AND DISPLAY MODULE FOR MOTOR VEHICLES

(75) Inventor: Henry Beraud, Vincennes (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/007,080

(22) PCT Filed: Mar. 29, 2012

(86) PCT No.: PCT/FR2012/000111
§ 371 (c)(1),
(2), (4) Date: Dec. 4, 2013

(87) PCT Pub. No.: WO2012/131188
PCT Pub. Date: Oct. 4, 2012

(65) Prior Publication Data
US 2014/0085258 A1 Mar. 27, 2014

(30) Foreign Application Priority Data
Mar. 31, 2011 (FR) ...................................... 11 00975

(51) Int. Cl.
*G06F 3/044* (2006.01)
*B60K 37/00* (2006.01)
*B60K 35/00* (2006.01)
*B60K 37/06* (2006.01)

(52) U.S. Cl.
CPC .............. *G06F 3/044* (2013.01); *B60K 35/00* (2013.01); *B60K 37/00* (2013.01); *B60K 37/06* (2013.01); *B60K 2350/1024* (2013.01); *B60K 2350/1028* (2013.01); *B60K 2350/941* (2013.01)

(58) Field of Classification Search
CPC .... B60K 2350/1024; B60K 2350/1028; B60K 2350/941; B60K 35/00; B60K 37/00; B60K 37/06; G06F 3/044
USPC ..................... 345/170–174; 349/58; 340/164
See application file for complete search history.

(56) References Cited

U.S. PATENT DOCUMENTS

| 6,088,069 A * | 7/2000 | Farlow ............................ 349/12 |
| 9,433,116 B2 * | 8/2016 | Beraud ................. B60K 37/06 |
| 2008/0026206 A1 * | 1/2008 | Matsumoto et al. ......... 428/327 |

(Continued)

FOREIGN PATENT DOCUMENTS

| EP | 1901530 A1 | 3/2008 |
| JP | 2002-341842 A | 11/2002 |

OTHER PUBLICATIONS

International Search Report issued in PCT/FR2012/000111 mailed on Jun. 14, 2012 (4 pages).

*Primary Examiner* — Tony Davis
(74) *Attorney, Agent, or Firm* — Osha Liang LLP

(57) ABSTRACT

The invention relates to a control and display module for motor vehicles, comprising: a display screen for displaying data; a capacitive touchpad for entering user commands, said touchpad at least partially overlapping the display screen; and a casing in which the display screen and the touchpad are housed, said casing comprising a front frame. The control and display module also comprises a retaining protective film having a thickness of between 0.5 and 1.2 mm, which is attached to the external edges of the front frame of the casing, the touchpad being secured at the rear of said film in a suspended manner.

11 Claims, 3 Drawing Sheets

(56) References Cited

U.S. PATENT DOCUMENTS

| | | | |
|---|---|---|---|
| 2008/0202251 A1* | 8/2008 | Serban | G01L 1/142 73/780 |
| 2009/0300531 A1* | 12/2009 | Pryor | 715/764 |
| 2010/0073594 A1* | 3/2010 | Miyazaki | 349/58 |
| 2010/0110025 A1* | 5/2010 | Lim | 345/173 |
| 2011/0001722 A1* | 1/2011 | Newman et al. | 345/174 |
| 2011/0050612 A1* | 3/2011 | Matsumoto et al. | 345/173 |
| 2011/0051334 A1* | 3/2011 | Griffith et al. | 361/679.01 |
| 2011/0075336 A1* | 3/2011 | Chiang et al. | 361/679.02 |
| 2011/0227718 A1* | 9/2011 | Waller et al. | 340/461 |
| 2011/0229730 A1* | 9/2011 | Yosomiya et al. | 428/500 |
| 2011/0248132 A1* | 10/2011 | Hirota | 248/222.14 |
| 2011/0267300 A1* | 11/2011 | Serban | H03K 17/9622 345/174 |
| 2012/0095643 A1* | 4/2012 | Bose et al. | 701/32.8 |
| 2013/0070401 A1* | 3/2013 | Arheit | 361/679.01 |
| 2013/0167077 A1* | 6/2013 | Nishihashi | 715/800 |
| 2014/0029207 A1* | 1/2014 | Beraud | B60K 37/06 361/728 |
| 2014/0285471 A1* | 9/2014 | Beraud | B60K 35/00 345/174 |

\* cited by examiner

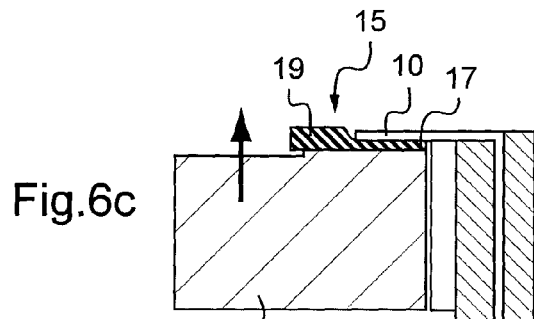
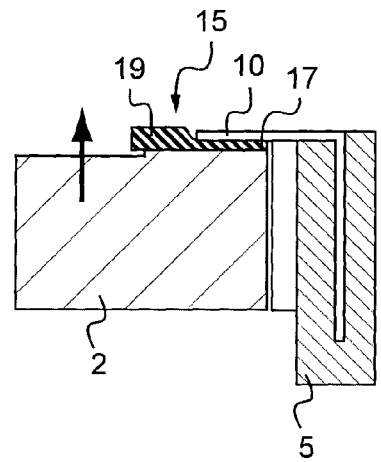
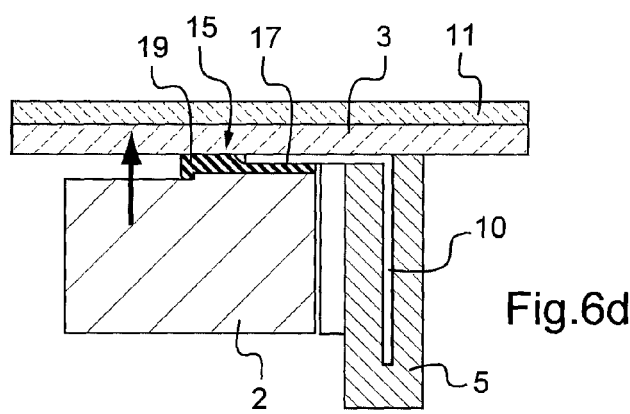
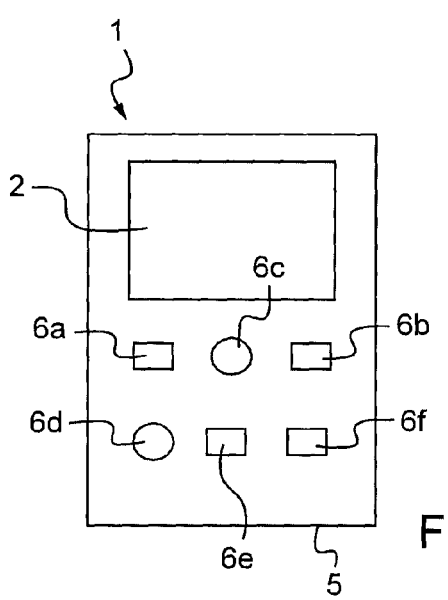

CONTROL AND DISPLAY MODULE FOR MOTOR VEHICLES

The present invention concerns the field of touch-sensitive surface control and display modules for motor vehicles. To be more specific, such a module finds an advantageous application to the controls situated in the vicinity of the driver, on the dashboard or the front console of a motor vehicle, for example for controlling air conditioning functions, an audio system, a telephony system, a multimedia system or a navigation system.

Motor vehicle control and display devices include a display screen for the display of information or control data. These screens may for example be covered with a transparent touchpad enabling input of commands by users of the vehicle. Some devices further include additional control buttons disposed in the vicinity of the screen.

The touchpad makes it possible to determine the coordinates at which a user finger is applied, for example using the resistive or capacitive technology.

These touchpads may be capacitive touchpads, for example, and it is the longer or shorter approach of a finger or a stylus that causes an identifiable disturbance to the capacitive field and makes it possible to define the position on the pad of the finger or stylus.

On the other hand, touchpads are thin and fragile elements. It is therefore necessary to protect them, notably from impacts that could be caused by users.

Moreover, motor vehicle manufacturers are at present seeking to render the facades of vehicles more ergonomic for the user by proposing control modules of smooth appearance and uniform feel.

Moreover, to obtain good display quality, motor vehicle manufacturers are confronted with various constraints like reducing the distance between the display screen and the external control surface. Also, in the case of capacitive pads, the distance between the control surface on which the user's finger is placed and the touchpad must be as small as possible to optimize the sensitivity of the touchpad and the distance between the control surface and the touchpad must not include any airgap.

The invention therefore proposes an improved control and display module for motor vehicles enabling a facade of smooth appearance and uniform feel and good display quality to be obtained.

The embodiments of the present invention therefore consist in a control and display module for motor vehicles including:
- a display screen for displaying data,
- a capacitive touchpad for input of commands by a user, said touchpad at least partly overlapping said display screen,
- a casing in which said display screen and said touchpad are housed, said casing including a front frame,
- the control and display module also includes a retaining and protection film the thickness of which is between 0.5 and 1.2 mm and which is fixed to the external edges of the front frame of the casing, the touchpad being secured, in a suspended manner, at the rear of said retaining and protection film.

In accordance with another aspect of the present invention the retaining and protection film comprises a layer of polycarbonate.

In accordance with a further aspect of the present invention the fixing of the retaining and protection film to the external edges of the front frame is effected by gluing.

In accordance with a further aspect of the present invention the fixing of the retaining and protection film to the external edges of the front frame is effected by overmolding.

In accordance with another aspect of the present invention the fixing of the retaining and protection film to the external edges of the front frame is effected by injection molding.

In accordance with a further aspect of the present invention the fixing between the touchpad and the retaining and protection film is effected by gluing.

In accordance with an additional aspect of the present invention the retaining and protection film may include a local opaque tint for masking at least the internal rim of the casing from the user.

In accordance with another aspect of the present invention the retaining and protection film includes a polarizing film on its external face.

In accordance with a further aspect of the present invention the retaining and protection film includes a non-scratch coating on its external face.

In accordance with an additional aspect of the present invention the touchpad is a capacitive pad.

In accordance with another aspect of the present invention the control and display module further includes control buttons, the retaining and protection film also covering said control buttons.

In accordance with another aspect of the present invention the thickness of the retaining and protection film is 0.75 mm.

Other features and advantages of the invention will become apparent in the course of the description to be given next with reference to the appended drawings which show one possible embodiment of the invention by way of non-limiting illustration.

In these drawings:

FIGS. 6a to 6d represent diagrams of various steps of assembling the components of a first embodiment of a control and display module in accordance with the present invention;

FIGS. 7a and 7b represent diagrammatic front views of the control and display module in accordance with an alternative embodiment of the present invention.

In the drawings the same reference numbers represent the same items.

Figure 1:
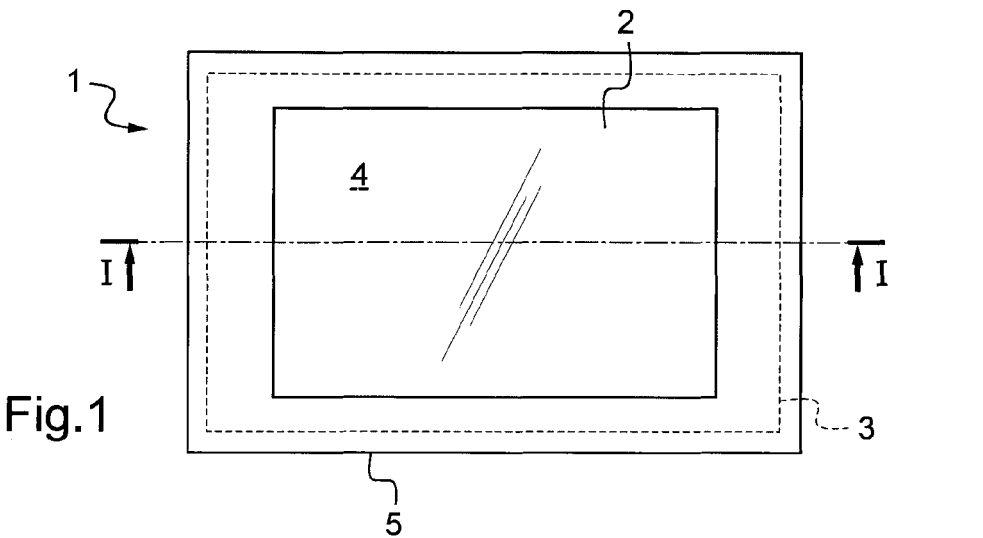
FIG. 1 represents a diagram of a front view of the control and display module in accordance with one embodiment of the present invention.

FIG. 1 represents a diagrammatic front view of a control and display module 1 for automobile vehicles, the module being disposed substantially vertically in the vehicle. The control and display module 1 may be fixed in the vicinity of the user, for example on the central console of the vehicle or on the dashboard (not shown), for example to control air conditioning functions, an audio system, a telephony system, a multimedia system or a navigation system.

In this figure, the control and display module 1 includes a display screen 2 for displaying information or control data, at least one touchpad 3 (represented in dashed outline) and has a control front surface 4 for input of commands by a user, the control front surface 4 at least partly overlapping the display screen 2, and a casing 5 in which the display screen 2 and the touchpad 3 are housed. In the first example represented in FIG. 1, the touchpad 3 covers the display screen 2 and projects beyond the sides of the screen 2.

The touchpad 3 is transparent so that it can be placed in front of the display screen 2 and can serve as input means. The touchpad 3 determines the coordinates in the plane of the pad 3 of the point at which the user's finger is pressing on the control front surface 4. For example, the touchpad 3 has capacitive properties. The movement or the pressure of a user's finger leads to the creation of a signal varying with the location, movement and extent of the contact of their finger with this surface.

Moreover, the display screen 2 is for example a thin-film transistor (TFT) screen, for example a 7-inch (or 17.78 cm) screen.

The display screen 2 and the touchpad 3 therefore enable the input of commands and the display of corresponding data.

Figure 2:
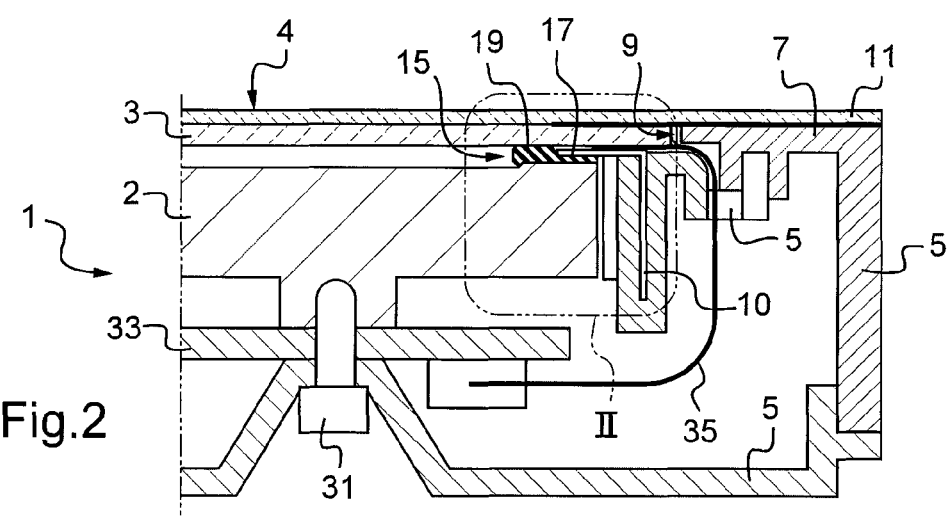
FIG. 2 represents a diagram of a view in cross section taken along the section line I-I of a control and display module in accordance with a first embodiment of the present invention.

FIG. 2 represents a plan view in section of part of the control and display module 1 in which the position of the various elements can be distinguished more clearly. Thus the control and display module 1 includes a casing 5 including a front frame 7 including an opening 9 and an internal rim 10. The casing 5 is made from plastic or rigid elastomer, for example.

The display screen 2 is positioned inside the casing 5 and oriented toward the control front surface 4. The touchpad 3 is positioned at the level of the opening 9 in the front frame 7 and at least partly overlaps the display screen 2. The touchpad 3 is secured at the rear of a retaining and protection film 11 the external surface of which constitutes the control front surface 4. Thus the touchpad 3 is suspended at the rear of the retaining and protection film 11. By retaining and protection film it must be understood that the touchpad is secured by the film 11, the latter also having a function of protecting the touchpad against external aggression such as the manipulations of the user, for example.

The touchpad 3 is stuck to the retaining and protection film 11 using an "optical glue" that makes it possible to guarantee a good quality of transparency. The retaining and protection film 11 is fixed to the external surface of the front frame 7. The fixing is effected so that the retaining and protection film 11 is "stretched" over the front frame 7.

The retaining and protection film 11 is a thin semi-rigid polycarbonate film, for example, which can be laminated, decorated by screenprinting it and fixed to the front frame 7. The fixing of the retaining and protection film 11 to the front face 7 may be effected by gluing, overmolding or injection molding. The retaining and protection film has a thickness between 0.5 and 1.2 mm, which is relatively thin in order to increase the sensitivity of the touchpad, gluing the touchpad to the retaining and protection film making it possible to compensate any lack of rigidity of the retaining and protection film because of its thinness. Moreover, 0.5, 0.75 and 1 mm polycarbonate films are commercially available, which ensures a low unit cost. It is also to be noted that the thickness of the retaining and protection film 11 depends on the size of the display screen 2 and the touchpad 3. Thus for 7" (17.78 cm) diagonal display screens 2, a thickness of 0.75 mm is suitable and a greater thickness is necessary for display screens 2 of larger size. However, because the touchpad 3 is stuck to the retaining and protection film 11, the touchpad 3 contributes greatly to the rigidity of the control front surface 4 as observed by the user, which makes it possible to limit the thickness of the retaining and protection film 11.

Moreover, the external face of this retaining and protection film 11 may also be covered with a polarizing film so as to limit the effects of glare and fingerprints. A non-scratch coating may equally be applied to the external surface of the retaining and protection film 11.

Moreover, the display screen 2 is, on the one hand, fixed to the casing 5 from behind, for example, by fixing screw 31 situated at the rear of the casing 5, i.e. on the side opposite the control front surface 4, and, on the other hand, retained at the front at the level of the periphery of the display screen 2 by the internal rim 10 projecting between the display screen 2 and the touchpad 3.

In order to limit its thickness, the internal ring 10 of the casing 5 is formed by a metal insert fixed to the casing 5, for example a steel or stainless steel insert that may be fixed to the casing 5 by overmolding, gluing, pop riveting, riveting, screwing or clipping. The casing 5 is molded over the metal insert 10, for example.

Moreover, to provide a seal, notably against dust or moisture that could infiltrate between the display screen 2 and the touchpad 3, the control and display module 1 also includes at least one seal.

In accordance with a first embodiment represented in FIG. 2, the control and display module 1 includes a uniform seal 15. A first portion 17 of the seal 15 is inserted between the internal rib 10 formed by the metal insert and the display screen 2, which makes it possible to retain the display screen 2 in position at the same time as protecting it from contact with the metal insert 10, and a second portion 19 of the seal 15 projects beyond the internal rim towards the center of the display screen 2. In this case, the seal 15 is made from a highly compressible open-cell foam so that the first portion 17 of the seal 15 is compressed so as to reduce its thickness by at least 50% relative to its initial thickness when unloaded, so that the second portion 19 provides the seal between the display screen 2 and the touchpad 3. The first portion is compressed by 70%, for example, and the second portion compressed by 20%. This high level of compression makes it possible to obtain a second portion 19 of the seal 15 with a thickness greater than the thickness of the first portion 17 and the internal rib 10 combined and therefore makes it possible to fill the gap between the internal rim 10 and the touchpad so as to provide the seal between the display screen 2 and the touchpad 3.

This type of seal 15 may be manufactured from cellular foam elastomer of the ethylene-propylene-diene monomer (EPDM) type such as a polyethylene. In fact, these materials have the advantage of having a low unit cost and of being non-inflammable, which is required in the automotive field.

Moreover, the seal 15 makes it possible to make good any tolerance differences relating to the thickness of the various elements of the control and display module 1 and to protect the display screen 2 from vibrations and impacts. It is also to be noted that large temperature variations can occur in the control and display module 1, notably because of the light sources present, which can lead to expansion of the various elements of the control and display module 1, the seal 15 making it possible to retain the elements in place and to limit stresses, notably at the level of the display screen 2 and the touchpad 3, which are relatively fragile elements.

The display screen 2 is therefore secured on the one hand by the fixing screws 31 and on the other hand by the internal rim 10 materialized by the metal insert via the first portion 17 of the seal 15. This first portion 17 of the seal 15 may have a length of 2 to 5 mm, for example. The second portion 19 of the seal 15 has a similar length of 2 to 5 mm. Moreover, the seal may have an initial thickness of 0.8 mm, the thickness being reduced to 0.3 mm after compression at the level of the first portion 17. The thickness of the metal insert 10 may also be 0.3 mm, for example. The second portion 19 of the seal 15 makes it possible to join the display screen 2 and the touchpad 3 and also makes it possible to protect the touchpad 3 from contact with the metal insert 10. However, the compression of the second portion 19 of the seal 15 must be limited so as to limit the pressure exerted by the seal 15 on the touchpad 3, which could lead to deformation of the pad and of the protecting screen 11 to which the pad is fixed, which deformation could be seen and felt by the user.

The thickness of the touchpad 3 is approximately 1.1 mm and the thickness of the retaining and protection film 11 is approximately 0.75 mm and so the total distance between the display screen 2 and the control front surface 4 is approximately 3 mm (0.75 mm+1.1 mm+0.8 mm+0.3 mm), the display screen 2 having a 0.3 mm rim at its periphery.

On the other hand, the control and display module 1 includes a printed circuit 33 connected on the one hand to the display screen 2 and on the other hand to the touchpad 3 via a connecting ribbon cable 35 and making it possible to manage control and display electronic signals.

The connection between the connecting ribbon cable 35 and the touchpad 3 may be located on either face of the touchpad 3 according to the technology employed so that when the connection is made on the face in contact with the protecting screen 11 the additional thickness created by the connection between the connecting ribbon cable 35 and the touchpad 3 must be compensated, for example, by a layer of glue or a transparent film, to avoid a difference in level that the user could feel.

Figure 3:
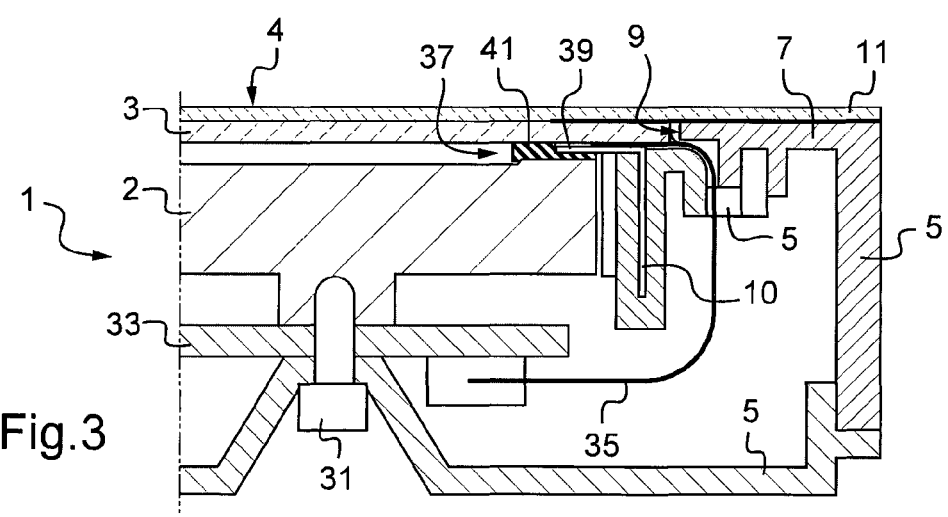
FIG. 3 represents a diagram of a view in cross section taken along the section line I-I of a control and display module in accordance with a second embodiment of the present invention.

In accordance with a second embodiment represented in FIG. 3, the seal is a two-stage seal 37 comprising two portions 39 and 41. The thin first portion 39 is intended to be inserted between the internal rim 10 formed by the metal insert and the display screen 2. The thicker second portion 41 is intended to project beyond the internal rim 10 towards the center of the display screen 2 so as to be interleaved between the display screen 2 and the touchpad 3, the two portions 39 and 41 of the two-stage seal 37 having the same functions as the two portions 17 and 19 of the seal 15 in the previous embodiment. The two-stage seal 37 may be formed of an open-cell foam or a closed-cell foam since in this embodiment the first portion 39 of the two-stage seal 37 is not as compressed as in the previous embodiment. The first portion 39 of the seal 37 can therefore have a length of 2 to 5 mm, for example, and an initial thickness of 0.5 mm when unloaded and 0.3 mm once compressed, whereas the second portion 41 may have a length of 2 to 5 mm and an initial thickness of 0.9 or 1 mm when unloaded and approximately 0.8 mm once compressed. The resulting distance between the display screen 2 and the control front surface 4 in this embodiment is the same as in the previous embodiment. The other elements of the control and display module 1 from FIG. 3 are moreover identical to the preceding embodiment shown in FIG. 2.

Figure 4:
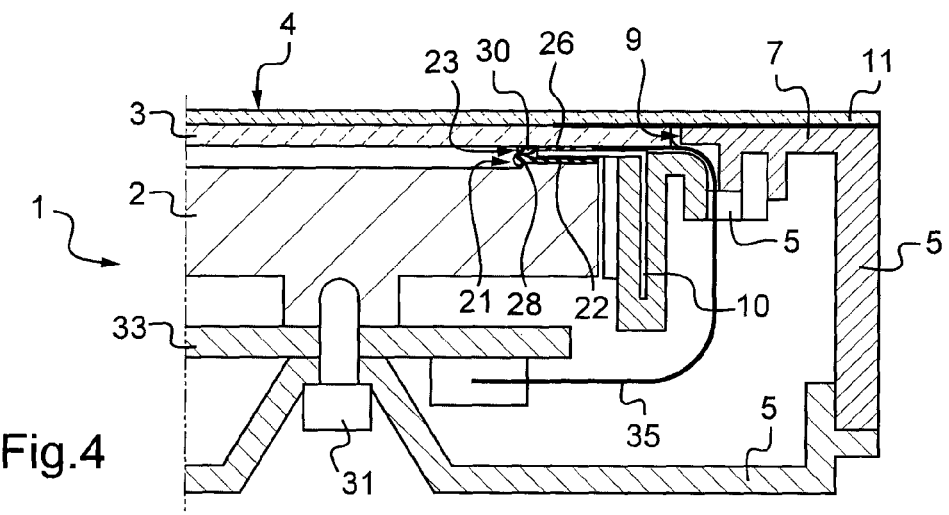
FIG. 4 represents a diagram of a view in cross section taken along the section line I-I of a control and display module in accordance with a third embodiment of the present invention.

In accordance with a third embodiment shown in FIG. 4, in addition to a seal 21 the first portion 22 of which is interleaved between the display screen 2 and the internal rim 10 of the casing 5, the control and display module 1 includes a further seal 23 the first portion 26 of which is interleaved between the internal rim 10 of the casing 5 and the touchpad 3. The respective second portions 28 and 30 of the two seals 21 and 23 project beyond the internal rim 10 toward the center of the display screen 2. The combination of the two seals 21 and 23 therefore makes it possible to produce a seal between the display screen 2 and the touchpad 3. In this case, the two seals 21 and 23 have an initial thickness when unloaded of 0.5 or 0.6 mm, for example, the first portion of the two seals having a length of 2 to 5 mm and a thickness of 0.3 mm once compressed and the second portion also having a length of 2 to 5 mm. The resulting distance between the display screen 2 and the control front surface 4 in this embodiment is more or less the same as in the previous embodiments. The other elements of the control and display module 1 from FIG. 4 are moreover identical to the previous embodiments shown in FIGS. 2 and 3.

On the other hand, it is to be noted that the seal or seals of the embodiments described above make it possible to mask the edge of the internal rim 10 consisting of the metal insert. In fact, the seal or seals may colored, for example matt black, and therefore mask the edge of the metal insert 10, which then need not be painted, which reduces its cost.

Moreover, in the various embodiments described above, the seal (respectively the seals) may be secured by the pressure of the elements with which it is in contact but the seal (respectively the seals) may also be a seal of the double-sided adhesive type, i.e. its two faces may include an adhesive substance making it possible to stick the seal (respectively the seals) to the surfaces of the elements with which it is in contact. In accordance with an alternative embodiment, the seal may have an adhesive substance on only one of its faces, which makes it possible to secure the seal in place, notably during manufacture, the sealing effect being provided by compression of the seal.

Figure 5:
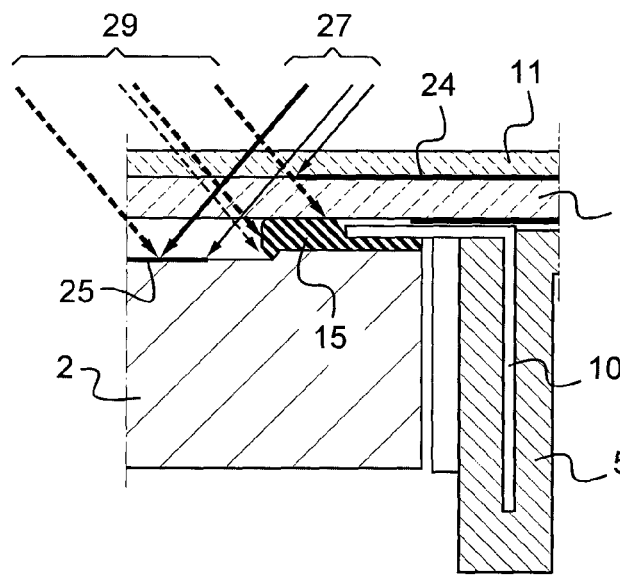
FIG. 5 represent a diagram of a detail II from FIG. 2 in accordance with a first embodiment of the present invention and the extreme viewing angles of users.

On the other hand, the technical elements of the control and display module 1 must be masked from the field of view of the user in order to obtain a successful aesthetic finish. To this end, an opaque tint 24 (corresponding to a decorative film) is applied to the retaining and protection film 11 as represented in FIG. 5, which shows diagrammatically a detail II from FIG. 2. This tint 24 is applied to the face of the retaining and protection film 11 in contact with the touchpad 3 and the front frame 7 so as not to be felt by the user and to facilitate the application of polarizing films or non-scratch coatings to the external face of the retaining and protection film 11.

Thus in FIG. 5 arrows 27 and 29 represent the angles of view of a user considered as the extreme angles and corresponding to an angle of 40° relative to the normal to the display screen 2. The limit of application of the opaque tint 24 is determined so that it does not mask the edge of the displayed image (indicated by the line 25) on the display screen 2 from one side (arrows 27), which makes it possible to mask the metal insert from the other side (arrows 29), the edge of the metal insert 10 being masked by the seal 15. The user therefore sees the whole of the image on the display screen 2 but does not see the technical portions of the control and display module 1 and notably the metal insert 10. Moreover, it is to be noted that instead of the opaque tint 24 a polarizing or smoked film also makes it possible to mask the grayish general appearance of the seal and the glue, if any.

In order to explain better the disposition of the various elements of the control and display module 1, FIGS. 6a-6d represent different steps in the assembly of some elements in the first embodiment in which the seal 15 has a uniform thickness over the whole of its length.

Figure 6A:
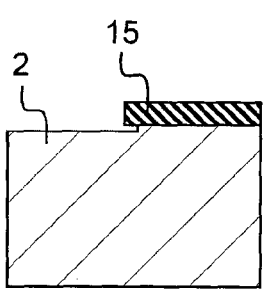

FIG. 6*a* represents the first step of the assembly process in which the seal 15 is positioned on the display screen 2 so as to be aligned with the rim of the display screen 2. In the case of a seal of the double-sided adhesive type, the seal 15 is stuck to the display screen 2.

Figure 6B:
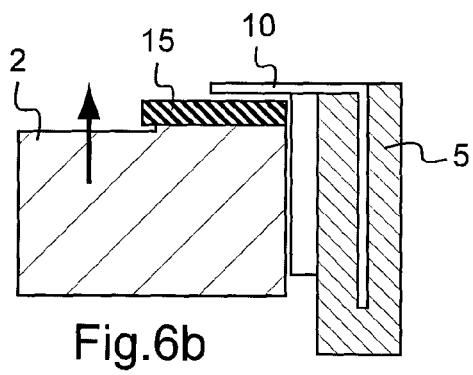

FIG. 6*b* represents the second step of the assembly process, in which the display screen 2 is positioned in the casing 5 so that the first portion 17 of the seal 15 situated on the exterior side of the display screen 2 comes to bear on the internal rim 10. In the case of a seal of the double-sided adhesive type, the seal is stuck to the internal rim 10.

FIG. 6*c* represents the third step of the assembly process, in which the depth of the display screen 2 is adjusted in order to compress the first portion 17 of the seal 15 against the internal rim 10.

FIG. 6*d* represents the fourth step of the assembly process, in which the assembly comprising the touchpad 3 and the retaining and protection film 11 is fixed to the external surface of the front frame 7 of the casing 5, which leads to slight compression of the second portion 19 of the seals 15 by the touchpad 3. In the case of a seal of the double-sided adhesive type, the second portion 19 of the seal 15 is stuck to the touchpad 3. The second portion 19 of the seal 15 therefore provides a seal between the display screen 2 and the touchpad 3.

FIG. 7*a* represents a diagrammatic front view of an alternative embodiment of a control and display module 1 for motor vehicles in which the module 1 comprises different touch-sensitive control areas (delimited in dashed line). In addition to the touch-sensitive area corresponding to the display screen 2, the module 1 also includes touch-sensitive areas 6*a* to 6*f* making it possible to simulate control buttons. These areas may be back-lit, for example, so as to be viewed when driving in the daytime or at night and to give the illusion that they are completely integrated into the module 1.

Moreover, the touch-sensitive areas 6*a*-6*f* do not have a display screen behind the touchpad, which makes it possible to reduce costs significantly, at the same time as being transparent for the user. By applying a black tint such as the opaque tint 24 shown in FIG. 5 over the whole of the retaining and protection film except the display screen 2 and the back-lit control areas 6*a*-6*f*, a smooth control front surface is therefore obtained showing the image of the display screen and the back-lit buttons as represented in FIG. 7*b*. Moreover, in such a configuration, the casing 5 is extended towards the touch-sensitive control areas 6*a*-6*f* so as to produce a rigid supporting block for the equipment associated with these touch-sensitive control areas 6*a*-6*f*.

The various embodiments of the present invention therefore make it possible to secure the display screen 2 in position even in the event of impacts or vibrations, at the same time as guaranteeing a seal between the display screen 2 and the touchpad 3. Moreover, the retaining and protection film 11 secured to the front frame makes it possible to obtain a smooth and uniform finish of the exterior facade of the control and display module 1 at the same time as achieving a good quality of display and good detection by the touchpad 3 because of the small thickness of the retaining and protection film 11 and the short distance between the retaining and protection film 11 and the display screen 2.

The invention claimed is:

1. A control and display module for motor vehicles comprising:
    a display screen that displays data;
    a capacitive touchpad configured for input of commands by a user, said touchpad at least partly overlapping said display screen;
    a casing that houses said display screen and said touchpad, said casing comprising a front frame; and
    a retaining and protection film with a thickness between 0.5 and 1.2 mm is fixed to the external edges of a top surface of the front frame of the casing,
    wherein the retaining and protection film is disposed on a top surface of the touchpad that faces away from the display screen to protect the top surface of the touchpad against external aggression,
    wherein the retaining and protection film secures the touchpad in the casing, in a suspended manner, on a same horizontal plane as the front frame of the casing,
    wherein the retaining and protection film covers the entire surface of the touchpad to create a smooth level horizontal plane on a surface of the control and display module, and
    wherein the retaining aid protection film includes a non-scratch coating on its external face.

2. The control and display module as claimed in claim 1, wherein the retaining and protection film comprises a layer of polycarbonate.

3. The control and display module as claimed in claim 1, wherein the fixing of the retaining and protection film to the external edges of the front frame is effected by gluing.

4. The control and display module as claimed in claim 1, wherein the fixing of the retaining and protection film to the external edges of the front frame is effected by overmolding.

5. The control and display module as claimed in claim 1, wherein the fixing of the retaining and protection film to the external edges of the front frame is effected by injection molding.

6. The control and display module as claimed in claim 1, wherein the fixing between the touchpad and the retaining and protection film is effected by gluing.

7. The control and display module as claimed in claim 1, wherein the retaining and protection film includes a local opaque tint that masks at least the internal rim of the casing from the user.

8. The control and display module as claimed in claim 1, wherein the retaining and protection film includes a polarizing film on its external face.

9. The control and display module as claimed in claim 1, further comprising control buttons, the retaining and protection film also covering said control buttons.

10. The control and display module as claimed in claim 1, wherein the thickness of the retaining and protection film is 0.75 mm.

11. A control and display module for motor vehicles comprising:
    a display screen that displays data;
    a capacitive touchpad configured for input of commands by a user, said touchpad at least partly overlapping said display screen;
    a casing that houses said display screen and said touchpad, said casing comprising a front frame; and
    a retaining and protection film with a thickness between 0.5 and 1.2 mm is fixed to the external edges of a top surface of the front frame of the casing,
    wherein the retaining and protection film is disposed on a top surface of the touchpad that faces away from the display screen to protect the top surface of the touchpad against external aggression, wherein the retaining and protection film secures the touchpad in the casing, in a suspended manner, on a same horizontal plane as the front frame of the casing, wherein the retaining and protection film covers the entire surface of the touchpad to create a smooth level horizontal plane on a surface of the control and display module, and wherein the retaining and protection film includes a polarizing film on its external face.

* * * * *